United States Patent
Kudo

[11] Patent Number: 6,088,171
[45] Date of Patent: *Jul. 11, 2000

[54] PROJECTION OPTICAL SYSTEM

[75] Inventor: Shintaro Kudo, Kawasaki, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/054,082

[22] Filed: Apr. 2, 1998

[30] Foreign Application Priority Data

Apr. 3, 1997 [JP] Japan ................................ 9-102504

[51] Int. Cl.$^7$ .............................. G02B 9/00; G02B 3/00
[52] U.S. Cl. .......................................... 359/754; 359/649
[58] Field of Search .................... 359/649–651, 359/727–735, 364, 754; 355/44, 46, 53

[56] References Cited

U.S. PATENT DOCUMENTS

| | | | |
|---|---|---|---|
| 4,811,055 | 3/1989 | Hirose | 355/67 |
| 4,891,663 | 1/1990 | Hirose | 355/53 |
| 5,555,479 | 9/1996 | Nakagiri | 359/355 |
| 5,568,325 | 10/1996 | Hirano et al. | 359/785 |
| 5,636,000 | 6/1997 | Ushida et al. | 355/53 |
| 5,691,802 | 11/1997 | Takahashi | 359/730 |
| 5,694,241 | 12/1997 | Ishiyama et al. | 359/727 |
| 5,771,125 | 6/1998 | Ishiyama | 359/727 |
| 5,805,334 | 9/1998 | Takahashi | 359/727 |
| 5,805,357 | 9/1998 | Omura | 359/727 |
| 5,835,275 | 11/1998 | Takahashi et al. | 359/727 |

FOREIGN PATENT DOCUMENTS 0712019  5/1996  European Pat. Off. .

*Primary Examiner*—Georgia Epps
*Assistant Examiner*—Jordan M. Schwartz
*Attorney, Agent, or Firm*—Eugene Lieberstein; Michael N. Meller

[57] ABSTRACT

A projection optical system including a first lens group G1 having positive power; a second lens group G2 having negative power; and a third lens group G3 having positive power wherein the lens elements in each of the lens groups are composed of glass materials selected from the group consisting of fluorite and quartz. Also, the projection optical system satisfies the following condition:

$$|L/f|<2$$

$$0.7 \leq f_3/f_{3C} \leq 2.8$$

where:
L: distance between an objective plane and an image plane
f: focal length of the entire system
$f_3$: focal length of the third lens group G3
$f_{3C}$: composite focal length of fluorite lens elements which are included in the third lens group G3.

8 Claims, 13 Drawing Sheets

PROJECTION OPTICAL SYSTEM

FIELD OF THE INVENTION

The present invention relates to a projection optical system and more particularly to a reducing refraction projection optical system for optically projecting on semiconductor wafers in an exposure device at high resolution preferably with compensation for both chromatic aberrations and other monochromatic aberrations accomplished at the same time.

BACKGROUND OF THE INVENTION

In the manufacture of integrated circuits, higher resolution is required for the exposure transfer of circuit patterns. Since resolution is known to be inversely proportional to exposure wavelengths the exposure wavelengths have been designed to have shorter waves. In recent years, KrF excimer laser (248 nm) and ArF excimer laser (193 nm) have drawn attention for use as the exposure light source. Due to the limitation in transmittance, the composition of the glass materials, used in the oscillated wavelength ranges, for the above ultra violet lasers are limited. Also, the dispersion of refraction index of a glass material is larger in the oscillated wavelength range for the ArF laser compared to the KrF laser. As such a decrease in imaging performance due to chromatic aberrations will become noticeable. In order to solve the above problem, several methods have been proposed with one method involving narrowing the band of the spectrum in the laser such that it is almost a monochromatic light source and with another method involving compensating for chromatic aberrations in the projection optical system.

However, in order to provide complete compensation for chromatic aberrations over a wide spectrum range for a given source of laser illumination, it is essential to combine a fluorite lens having strong positive power and a quartz lens having strong negative power. Since the glass materials mentioned above have extremely small difference between each other in dispersion of index of refraction this limits complete compensation for chromatic aberrations and makes compensation of other monochromatic aberrations extremely difficult which, in turn, prevents the projection lenses from having improved imaging performance. Also, it makes tolerance of decentering strict and assembly difficult.

The present invention provides a projection optical system in which both problems of partial compensation of chromatic aberrations and compensation of other monochromatic aberrations may be handled simultaneously. Therefore, the range of spectrum of a laser light source for exposure can be set wider so that the throughput is improved.

SUMMARY OF THE INVENTION

In order to resolve the above issues, a projection optical system of the present invention comprises:

a first lens group G1 having positive power;

a second lens group G2 having negative power; and a third lens group G3 having positive power;

wherein each of the lens groups have lens elements composed of glass materials selected from the group consisting of fluorite and quartz; and wherein:

the projection optical system satisfies the following conditions:

$$|L/f|<2 \quad (1)$$

$$0.7 \leq f_3/f_{3C} \leq 2.8 \quad (2)$$

where:

L: distance between an objective plane and an image plane f: focal length of the entire system $f_3$: focal length of the third lens group G3

$f_{3C}$: composite focal length of fluorite lens elements which are included in the third lens group G3.

DESCRIPTION OF THE PREFERRED EMBODIMENTS

Figure 1:
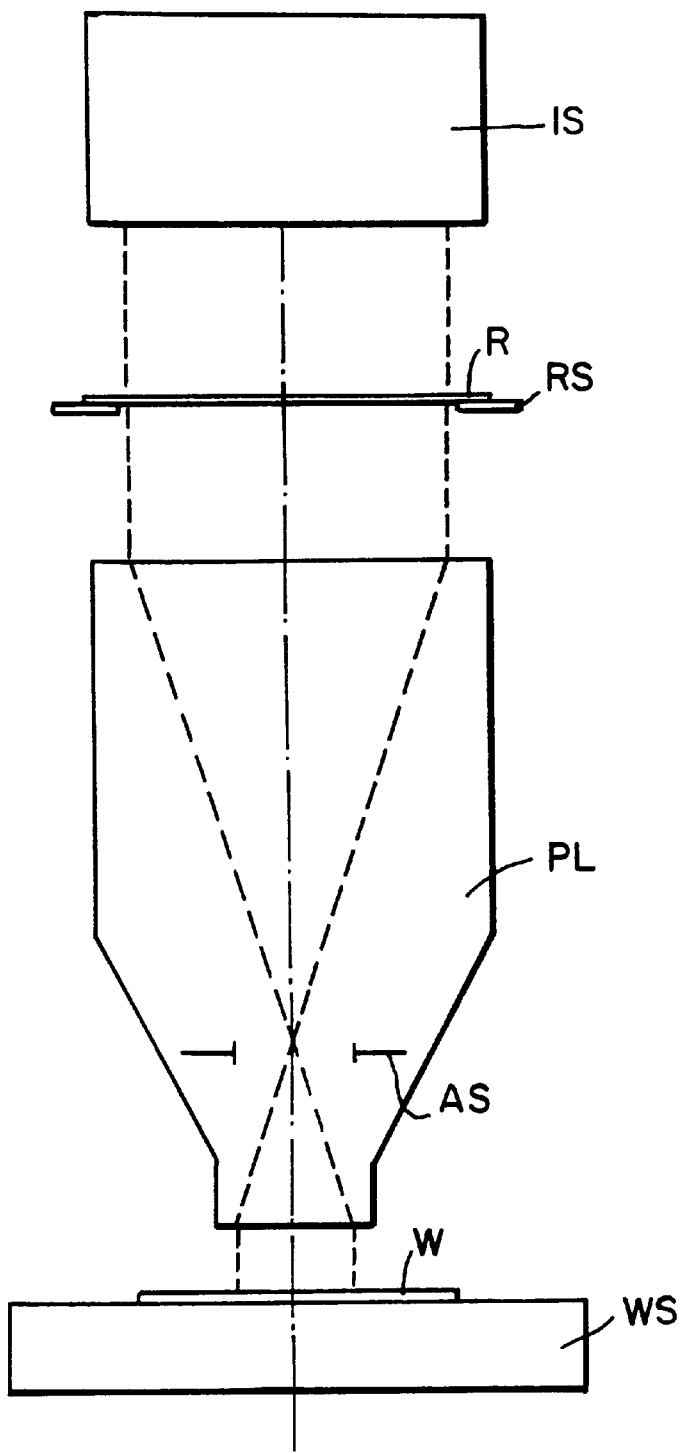
FIG. 1 is a schematic drawing showing an exposure device incorporating the projection optical system of the present invention.

In order to accomplish compensation for both chromatic and monochromatic aberrations at the same time, the projection optical system must first be sufficiently compensated for monochromatic aberrations. Therefore, the projection optical system of the present invention comprises from the objective end:

a first lens group G1 having positive power;

a second lens group G2 having negative power; and a third lens group G3 having positive power;

wherein each of the lens groups have lens elements composed of glass materials selected from the group consisting of fluorite and quartz.

In addition the projection optical system should satisfy the following conditions:

$$|L/f|<2 \tag{1}$$

$$0.7 \leq f_3/f_{3C} < 2.8 \tag{2}$$

where:

L: distance between an objective plane and an image plane f: focal length of the entire system $f_3$: focal length of the third lens group G3

$f_{3C}$: composite focal length of fluorite lens elements which are included in the third lens group G3.

This arrangement of the lens groups in order of positive/negative/positive power allows the optical system to be telecentric at both-ends, that is, telecentric with respect to both the objective and the image ends. At the same time, the Petzval sum, which profoundly relates to "image planarity" in order to accomplish high resolution in the wide range of exposure areas, can be effectively compensated. The reason for employing an optical system which is the telecentric at the image and objective ends is to make this optical system less affected by fluctuation in magnification due to errors in the optical axis direction during exposure and less affected to distortions of silicon wafers on the image plane or to distortions of the reticle on the objective plane.

The above equation (1) is a condition for maintaining telecentricity. When the upper limit of the condition is exceeded, it is difficult to maintain excellent telecentricity so that excessive effects on focusing errors result.

In order to effectively compensate for chromatic aberrations it is preferred in accordance with the present invention to position the fluorite lens elements in the third lens group having positive power such that the above equation (2) is satisfied. Since a reciprocal of a focal length expresses power, equation (2) defines an appropriate range for the ratios of the composite power of only fluorite lens elements in the third lens group G3 to the power of the third lens group.

The following explains the reason for defining the power of the positive fluorite lens elements in relation to the power of the third lens group by using an aberration coefficient of axial chromatic aberration AXi as shown in the following equation:

$$AXi = Q_i h_i^2 \cdot [\delta n_i / n_i - \delta n_{i-1} / n_{i-1}] \tag{A}$$

where:

$Q_i$: invariable amount of Abbe on the (i)th plane $h_i$: paraxial ray height on the (i)th plane $n_i$: refraction index at the wavelength which is a reference for compensation of chromatic aberrations of the medium following the (i)th plane $\delta n_i$: difference between the refraction index at its short wavelength end and the refraction index at the long wavelength end, of the medium following the (i)th surface that is, dispersion.

The aberration coefficient of chromatic aberrations AXi is often used in each of the surfaces in an optical system as a means to understand the structure of occurrence and compensation of chromatic aberrations. As shown in equation (A), contribution of each of the surfaces to axial chromatic aberrations is proportional to dispersion of a glass material; it is also proportional to the squared number of its paraxial ray height. Therefore, in order to compensate chromatic aberration effectively, it is preferable to use a fluorite lens on the low dispersion side as a positive power lens element positioned high in the paraxial ray height for preventing occurrence of chromatic aberration.

Since the numerical aperature "NA" at the image end is larger in a reducing projection optical system, the paraxial ray height is higher in the third lens group G3, which is in the image end, than in the first lens group, which is in the objective end. Thus, the present invention intends to focus on the power ratios of the fluorite lens elements in the third lens group in order to accomplish effective compensation of chromatic aberration.

In equation (2), the upper limit is larger than 1. When a parameter of equation (2) is larger than 1, it indicates that the composite power of the fluorite lens elements is larger than the power of the third lens group; that is, the third lens group comprises quartz lens elements with negative power.

The second lens group G2 having negative power has a structure such that the paraxial ray height is low, which is convenient for compensation of the Petzval sum. However, contribution of chromatic aberrations compensation by the quartz lens elements with negative power in the second lens group G2 is less effective. Therefore, by using the paraxial ray height, the fluorite lens elements with positive power are positioned within the third lens group G3 such that occurrence of chromatic aberrations is prevented and at the same time, the quartz lens elements with negative power are positioned within the third lens group G3 such that chromatic aberrations are effectively compensated.

When the positive power of the fluorite lens elements become too strong such that the upper limit of equation (2) is exceeded, the corresponding negative power of the quartz lens elements become strong. When this results, occurrence of high order spherical and coma aberrations becomes noticeable due to the effects of each of the refraction surfaces with strong curvatures. Consequently, it is difficult to compensate for various monochromatic aberrations.

On the other hand, when the positive power of the fluorite lens elements become too small such that the lower limit of equation (2) is exceeded, occurrence of chromatic aberration by the quartz lens elements with positive power is noticeable and compensation of chromatic aberration by the quartz lens elements with negative power becomes insufficient resulting in incomplete compensation of chromatic aberration.

It is concluded that the composite power of the fluorite lens elements in the third lens group should preferably be within the range defined in equation (2).

The composite focal length of the fluorite lens elements in the third lens group $f_{3C}$ as shown in equation (2) is defined by equation (B) below:

$$1/f_{3c} \equiv \sum_{3C} [h_k / h_{3\max} \cdot 1/f_k] \tag{B}$$

$$= 1/h_{3\max} \cdot \sum_{3C} h_k / f_k$$

where:

$h_{3max}$: maximum value of paraxial ray height at the third lens group G3

$f_k$: focal length of each of the lens elements $h_k$: average of heights of paraxial rays at the front and back surfaces of each of the lens elements $\Sigma_{3C}$: sum of all fluorite lens elements included in the third lens group G3.

In a projection optical system of the present invention, differences in the paraxial ray heights of each of the lens elements are relatively large such that this optical system can not be considered as a contacting system with thin lenses. As a consequence, the composite power of the fluorite lens elements cannot be shown by a simple addition of powers of each of the fluorite lens elements, i.e. by addition of reciprocals of focal lengths of each of the lens elements $1/f_k$. Instead, in order to indicate the composite power, as shown in equation (B), the powers of each of the lens elements must be added after being weighted by ratios of the paraxial ray heights $h_k$ of each lens elements within the third lens group G3.

Furthermore, it is preferable to satisfy equation (3) below in order to construct the composite power of the fluorite lens elements in the third lens group G3 to satisfy equation (2).

$$0.8 \leq h_{3cmax}/h_{3max} \tag{3}$$

where:
$h_{3cmax}$: maximum value of paraxial ray height of all fluorite lens elements included in said third lens group G3.

Since fluorite has a lower refraction index than quartz, fluorite requires more curvature than quartz in order to construct a lens of the same power; as a result, occurrence of aberrations is more significant. By positioning the fluorite lens elements higher in the paraxial ray height so that equation (3) is satisfied, the weighting coefficient $h_k/h_{3max}$ becomes larger, as shown in equation (B), such that the curvature can be set smaller with smaller power $1/f_k$. That is, by employing the positioning defined by equation (3), occurrence of chromatic aberrations can be effectively controlled, as well as preventing occurrence of monochromatic aberrations.

When the maximum value of paraxial ray height of the fluorite lens elements $h_{3cmax}$ becomes too low that the lower limit of equation (3) is exceeded, it is difficult to compensate the high-order components of monochromatic aberrations such as spherical aberrations and coma aberrations while chromatic aberrations are compensated. That is, it becomes difficult to accomplish compensation of monochromatic aberrations and compensation of chromatic aberrations at the same time.

Also, in accordance with the practice of the present invention it is preferred that equation (4), as identified below, be satisfied.

$$0.8 \leq h_{3Qmax}/h_{3max} \tag{4}$$

where:
$h_{3Qmax}$: maximum value of paraxial ray height of all quartz lens elements included in said third lens group G3.

By satisfying equation (4), the maximum value of paraxial ray height $h_{3max}$ in the third lens group G3 becomes relatively smaller, and the weighting coefficient of equation (B) $h_k/h_{3max}$ becomes larger; consequently, curvature of the fluorite lens elements can be set smaller by decreasing power $1/f_k$.

However, when the maximum value of paraxial ray height of the quartz lens elements becomes too low such that the lower limit of equation (4) is exceeded, it is difficult to compensate for the high-order components of monochromatic aberrations such as spherical aberrations and coma aberrations while chromatic aberrations are compensated. That is, it becomes difficult to accomplish compensation of monochromatic aberrations and compensation of chromatic aberrations at the same time.

A projection optical system having reducing projection powers may be structured such that the paraxial ray height of the third lens group is higher than the ones of the first and second lens groups G1 and G2. In this case, the power of the third lens group G3 will be substantially related to occurrence of high-order components of spherical aberrations or coma aberrations compared to other lens groups. For this case it is preferred that the following condition is satisfied in relation to the power of the third lens group G3.

$$0.07 \leq f_3/L \leq 0.15 \tag{5}$$

When the positive power of the third lens group G3 becomes too strong such that the lower limit of equation (5) is exceeded, high order spherical aberrations or coma aberrations occur in the third lens group G3 so that it is difficult to compensate aberrations by other lens groups.

On the other hand, when the power of the third lens group becomes too weak such that the upper limit of equation (5) is exceeded, compensation for spherical and coma aberrations is convenient but the second lens group G2 can not provide strong negative power. Accordingly, it will be difficult to sufficiently compensate the Petzval sum.

In the present invention, in order to prevent occurrence of high order spherical and coma aberrations, it is preferable to satisfy the following equation:

$$0.15 \leq f_{3Cmax}/L \leq 1 \tag{6}$$

where:
$f_{3Cmax}$: focal length of a fluorite lens element placed such that its paraxial ray height is the highest among all fluorite elements of positive power included in said third lens group G3.

When the power of the fluorite lens elements which are positioned high in the paraxial ray height becomes too strong such that the lower limit of equation (6) is exceeded, high order components of spherical aberrations are largely generated such that sufficient compensation of spherical aberrations is prevented.

On the other hand, when the power of the fluorite lens elements which is positioned high in the paraxial ray height becomes too weak such that the upper limit of equation (6) is exceeded, the power of other fluorite lens elements positioned low in the paraxial ray height for compensation of chromatic aberrations become too strong and high order components of coma aberrations are largely generated. As a result, it is difficult to sufficiently compensate for coma aberrations.

Also, the quartz lens elements which are positioned high in the paraxial ray height and have negative power are important in terms of compensation of chromatic aberrations. However, the power of the quartz lens elements must be set within a given range in order to accomplish compensation of monochromatic aberrations and to compensate for chromatic aberrations at the same time. In the present invention, therefore, it is preferable that the following condition be satisfied:

$$0.2 \leq |f_{3Qmax}/L| \leq 1 \tag{7}$$

where:
$f_{3Qmax}$: focal length of a quartz lens element which is placed such that its paraxial ray height is the highest among all quartz lens elements of negative power included in said third lens group G3.

When the power of the quartz lens elements which are positioned high in the paraxial ray height and have negative power become too strong, it is convenient for compensation of chromatic aberrations. However, high order components of spherical aberrations become over-compensated such that imaging performance is deteriorated.

On the other hand, when the power of the quarts lens elements, which are positioned high in the paraxial ray height and have negative power, become too weak, high order spherical aberrations cannot be sufficiently compensated and at the same time it is difficult to compensate for chromatic aberrations.

When compensation for both monochromatic and chromatic aberrations is to be accomplished at the same time with a lower number of fluorite lens elements, it is necessary to increase efficiency in compensation of chromatic aberrations by providing a structure such that the average of paraxial ray heights of each of the fluorite lens elements $f_{3Cave}$ will be high while occurrence of monochromatic aberrations is prevented. To do this the curvature of the fluorite lens elements should be set as small as possible, that is, with small powers. This is preferably accomplished by satisfying equation (8) as indicated below particularly when compensation of chromatic aberrations is to be performed with a smaller number of fluorite lens elements.

$$0.8 \leq h_{3Cave}/h_{3max} \qquad (8)$$

where:

$h_{3Cave}$: average of paraxial ray heights of all fluorite lens elements included in said third lens group G3.

When the average paraxial ray height of the fluorite lens elements $h_{3Cave}$ becomes too low such that the lower limit of equation (8) is exceeded, the ability of the fluorite lens elements to prevent occurrence of chromatic aberrations is significantly deteriorated and it is difficult to compensate spherical and coma aberrations when chromatic aberrations are unnaturally compensated. As a result, it is difficult to accomplish compensation of both chromatic and monochromatic aberrations at the same time.

Also, in order to compensate chromatic aberrations for a wide range of wavelength, it is necessary to additionally use fluorite lens elements in the first lens group. In this case, it is preferable to satisfy equation (9) below.

$$0.7 \leq f_1/f_{1c} \leq 2.5 \qquad (9)$$

where:

$f_1$: focal length of said lens group G1

$f_{1c}$: composite focal length of fluorite lens elements included in said lens group G1 also:

$$1/f_{1C} \equiv \sum_{1C} [h_k/h_{1max} \cdot 1/f_k]$$
$$= 1/h_{1max} \cdot \sum_{1C} h_k/f_k$$

where:

$h_{1max}$: maximum value of paraxial ray height of said first lens group G1

$\Sigma_{1c}$: sum of all fluorite lens elements included in said first lens group G1.

When the positive power of the fluorite lens elements in the first lens group G1 become too large such that the upper limit of equation (9) is exceeded, high order components of coma aberrations and field curvature largely occur such that it is difficult to accomplish compensations of both chromatic and monochromatic aberrations at the same time.

On the other hand, when the positive power of the fluorite lens elements in the first lens group G1 becomes too weak such that the lower limit of equation (9) is exceeded, chromatic aberrations caused by the quartz lens elements with positive power in the first lens group G1 can not be completely compensated such that it is not possible to sufficiently compensate chromatic aberrations corresponding to a wide range of wavelength.

The invention is best understood with reference to FIGS. 1–13. Each of the embodiments represent an application of the projection optical system of the present invention to an exposure device as shown in FIG. 1. In FIG. 1 the Reticle R (the first object), on which a given circuit pattern is formed, is placed as a mask substrate on the objective plane of the projection optical system PL of the present invention. Wafer W (the second object) as a substrate is placed on the image plane of projection optical system PL. Reticle R is held on reticle stage RS, and wafer W is held on wafer stage WS.

Illumination device IS, which uniformly illuminates reticle R by the Kohler illumination method, is placed above reticle R. Also, projection optical system PL is telecentric in the objective end; therefore, an image of a light source in illumination device IS is formed at the aperture stop AS of projection optical system PL. The image of the pattern on reticle R is exposed (transferred) onto wafer W by the projection optical system.

FIGS. 2, 5, 8 and 11 show the lens structures for the Embodiments 1 through 4 of the projection optical system of the present invention. Common to each of the different lens structure embodiments of the projection optical system of the present invention in order from the side of reticle R as the first object is:

a first lens group G1 having positive power;

a second lens group G2 having negative power; and a third lens group G3 having positive power. The lens groups should be substantially telecentric on both the objective end (the side of reticle R) and the image end (the side of wafer W).

In all of the embodiments, an excimer laser is used as a light source inside the illumination device IS to supply light beams having 193.4 nm of an exposure center wavelength λ.

Figure 2:
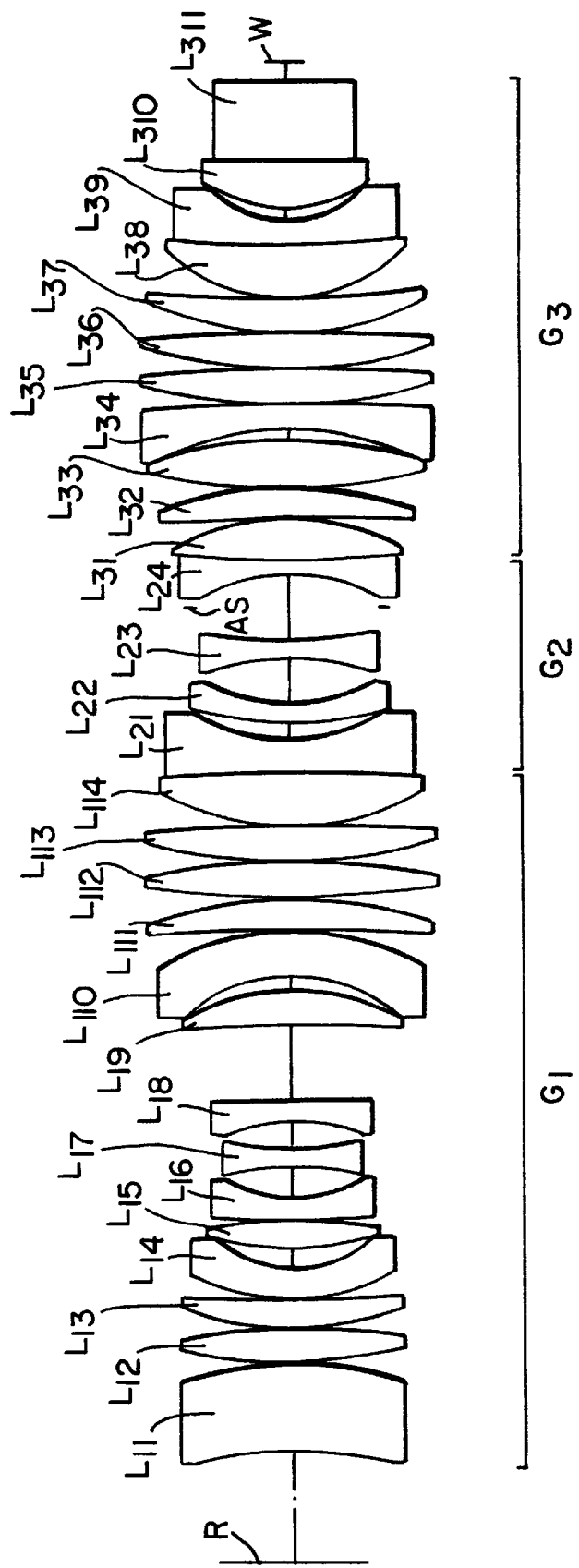
FIG. 2 shows the lens structure of Embodiment 1 of the projection optical system of the present invention.

In the refracting projection optical system of Embodiment 1 shown in FIG. 2, NA at the image end is 0.6, projection magnification β is ¼, and the diameter of the exposure area at the image end is 30.6. Also, chromatic aberrations are compensated by consideration of ±1 pm of spectrum range. First lens group G1 comprises 14 lens elements L11 through L114, which are made of quartz. Second lens group G2 comprises 4 lens elements L21 through L24, which are made of quartz. Third lens group G3 comprises 11 lens elements L31 through L311; with 6 of the lens elements in group 3 made of fluorite, and the other 5 made of quartz.

Figure 5:
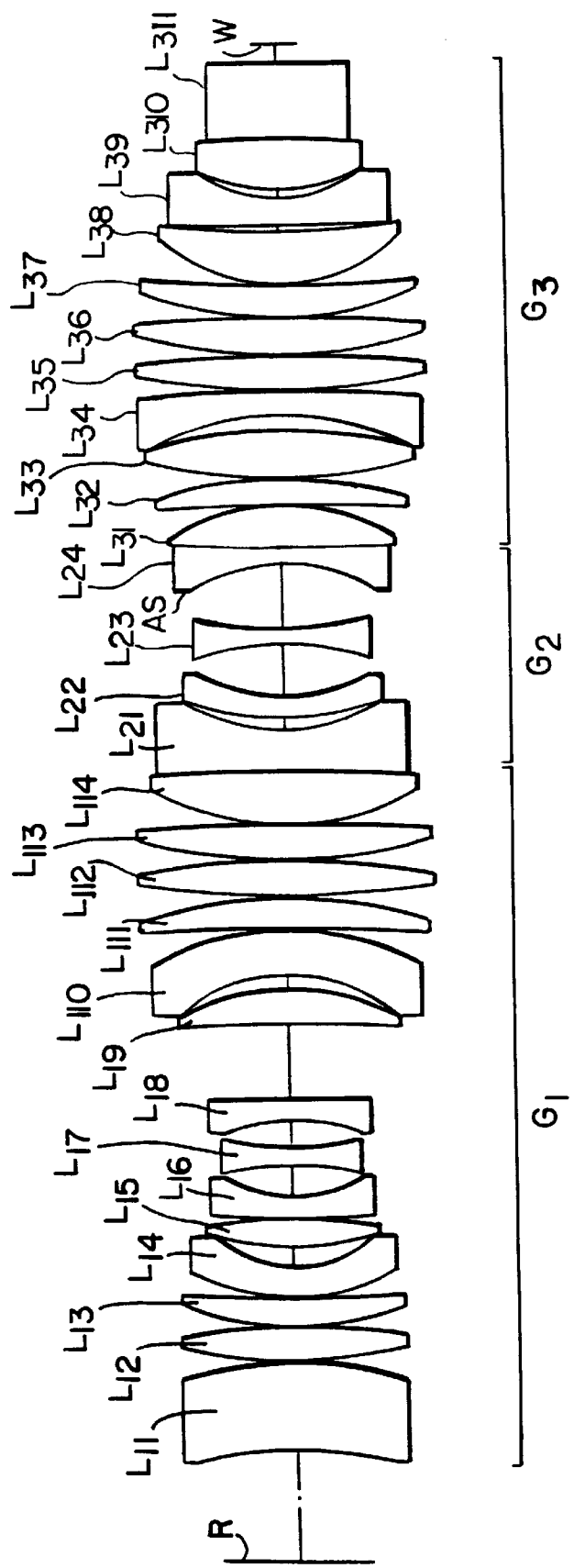
FIG. 5 shows the lens structure for Embodiment 2 of the projection optical system of the present invention.

In the refracting projection optical system of Embodiment 2 shown in FIG. 5, NA at the image end is 0.6, projection magnification β is ¼, and the diameter of the exposure area at the image end is 30.6. Also, chromatic aberrations are compensated by consideration of ±1 pm of spectrum range. First lens group G1 comprises 14 lens elements L11 through L114, which are made of quartz. Second lens group G2 comprises 4 lens elements L21 through L24, which are made of quartz. Third lens group G3 comprises 11 lens elements L31 through L311; with only lens elements L31, L33 and L38 made of fluorite and the remaining 8 lens elements made of quartz. Therefore, this embodiment has a higher necessity to satisfy the condition of equation (8).

Figure 8:
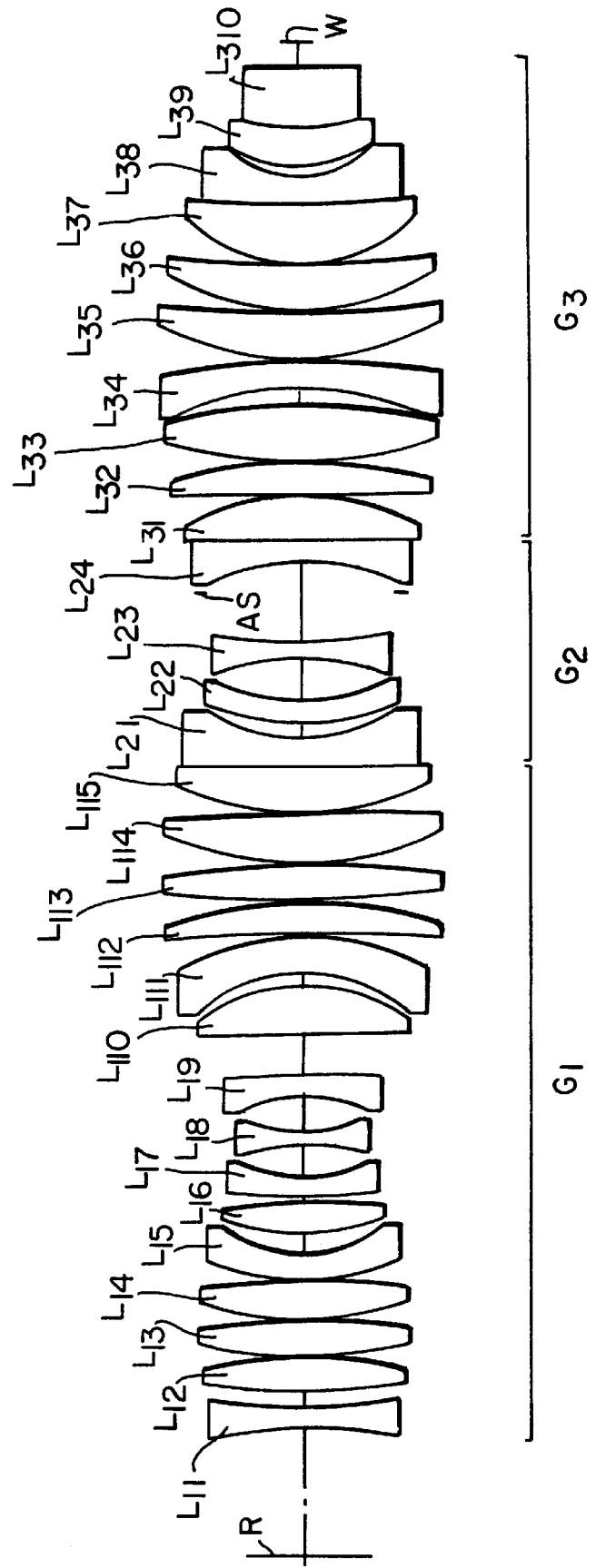
FIG. 8 shows the lens structure for Embodiment 3 of the projection optical system of the present invention.

In the refracting projection optical system of Embodiment 3 shown in FIG. 8, NA at the image end is 0.6, projection magnification β is ¼, and diameter of exposure area at the image end is 26.8. Also, chromatic aberrations are compensated by consideration of ±1 pm of spectrum range First lens group G1 comprises 15 lens elements L11 through L115; with the last 2 lens elements L114 and L115 made of fluorite and the remaining 13 lens elements made of quartz. Second lens group G2 comprises 4 lens elements L21 through L24, which are made of quartz. Third lens group G3 comprises 10 lens elements L31 through L310; with 5 of the lens elements made of fluorite, and the other 5 lens elements made of quartz. This embodiment differs from Embodiments 1 and 2 in the fact that the first lens group G1 comprises fluorite lens elements.

In Embodiments 1 through 3, compensations of both chromatic aberrations and coma aberrations are accomplished by placing biconvex fluorite lens element L33 and meniscus quartz lens element L34 having its concave surface toward the objective end adjacent to each other at a high position of the paraxial ray height in the third lens group G3.

Figure 3:
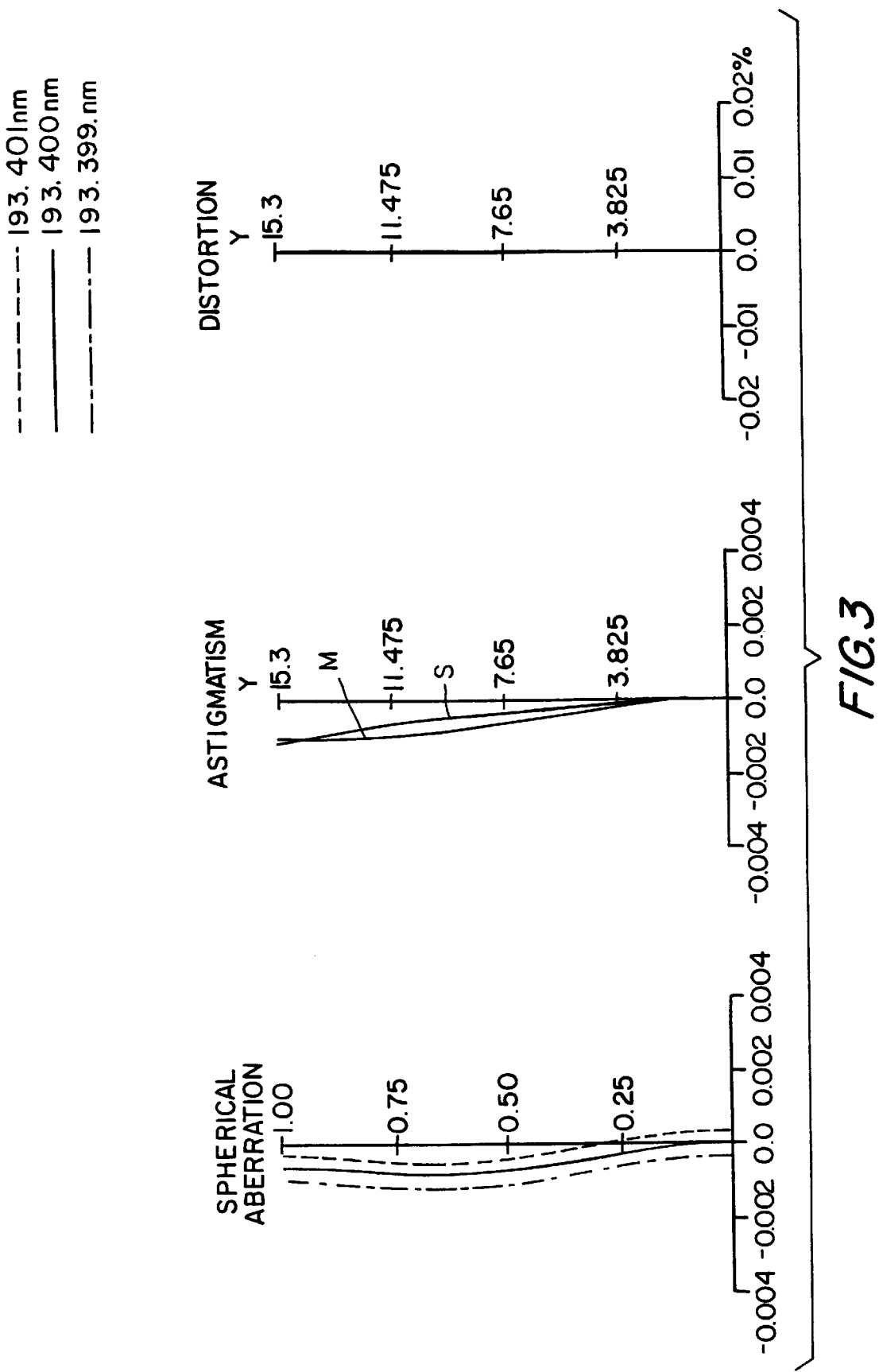
FIG. 3 are figures showing the spherical aberrations, astigmatism and distortion for Embodiment 1.
Figure 4:
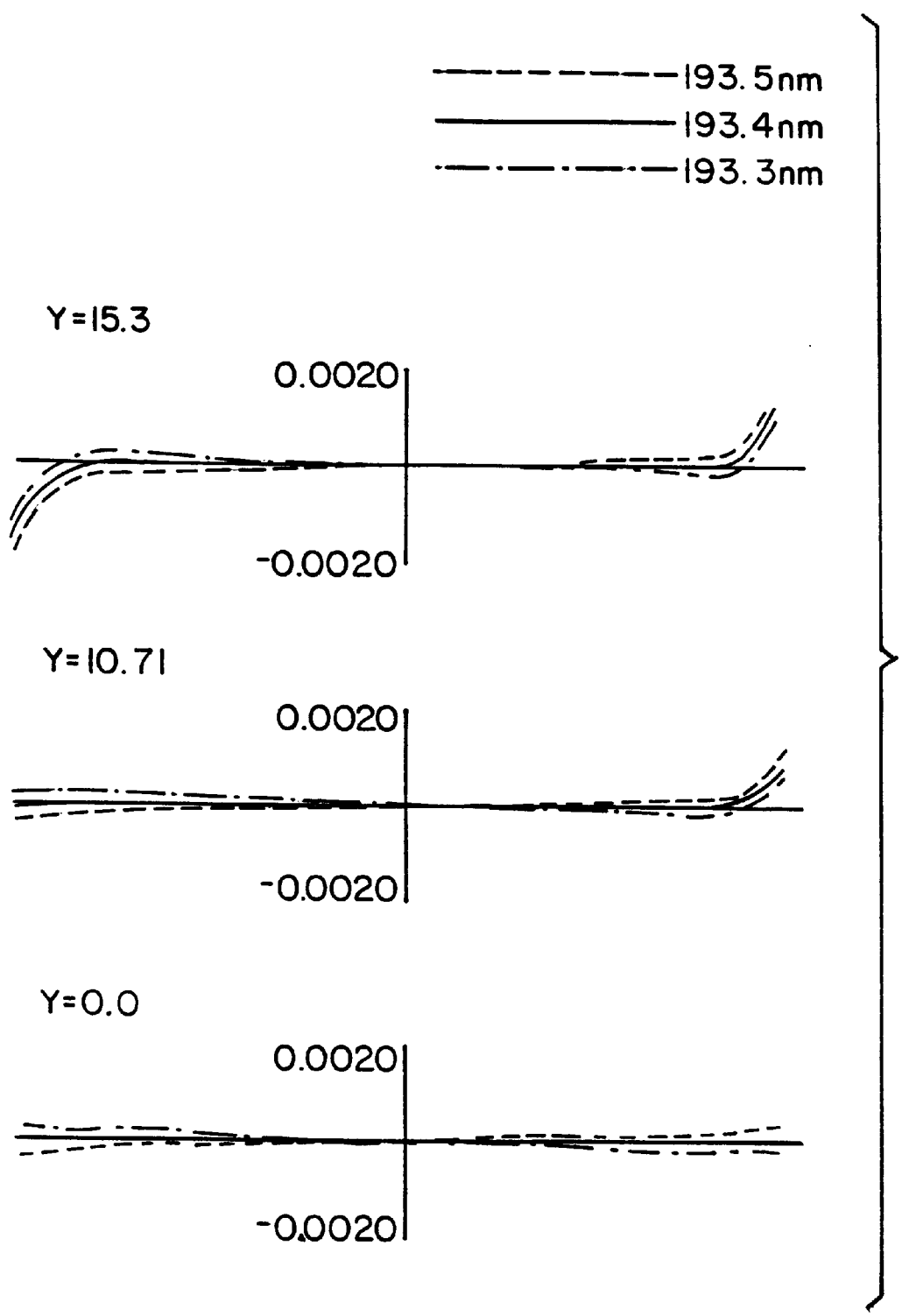
FIG. 4 are figures showing lateral aberrations in Embodiment 1.
Figure 6:
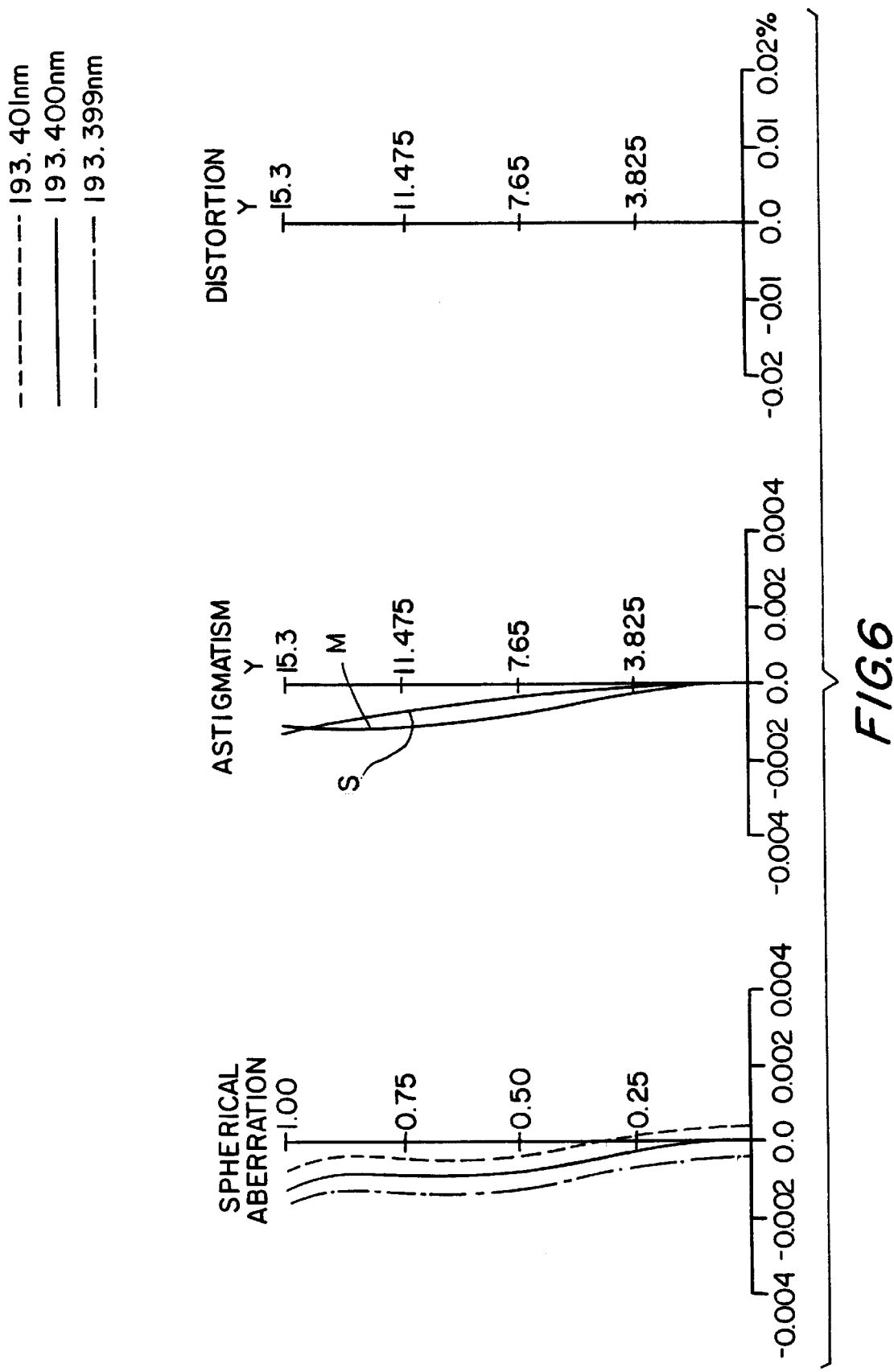
FIG. 6 are figures showing spherical aberrations, astigmatism and distortion for Embodiment 2.
Figure 7:
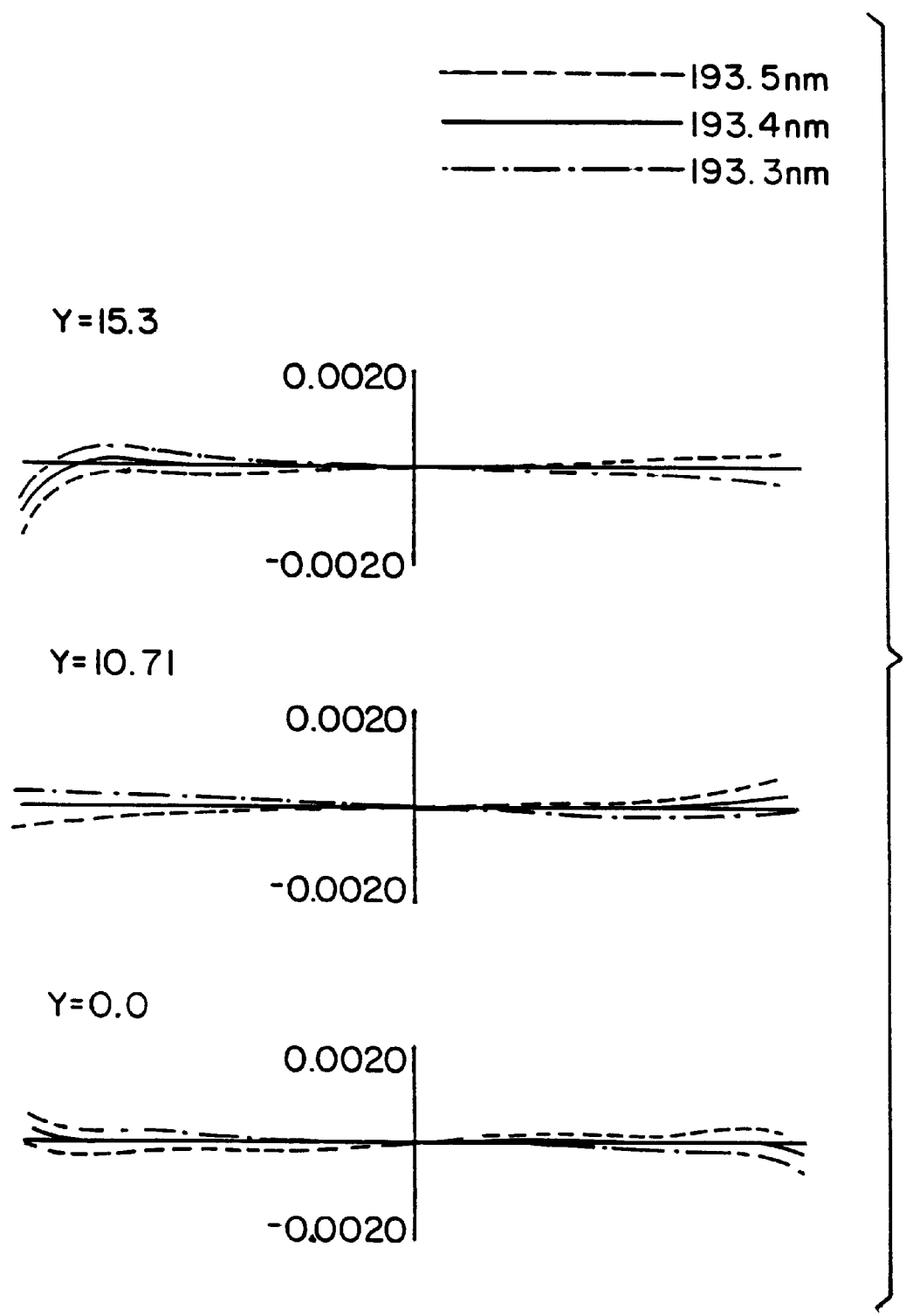
FIG. 7 are figures showing lateral aberrations in Embodiment 2.
Figure 9:
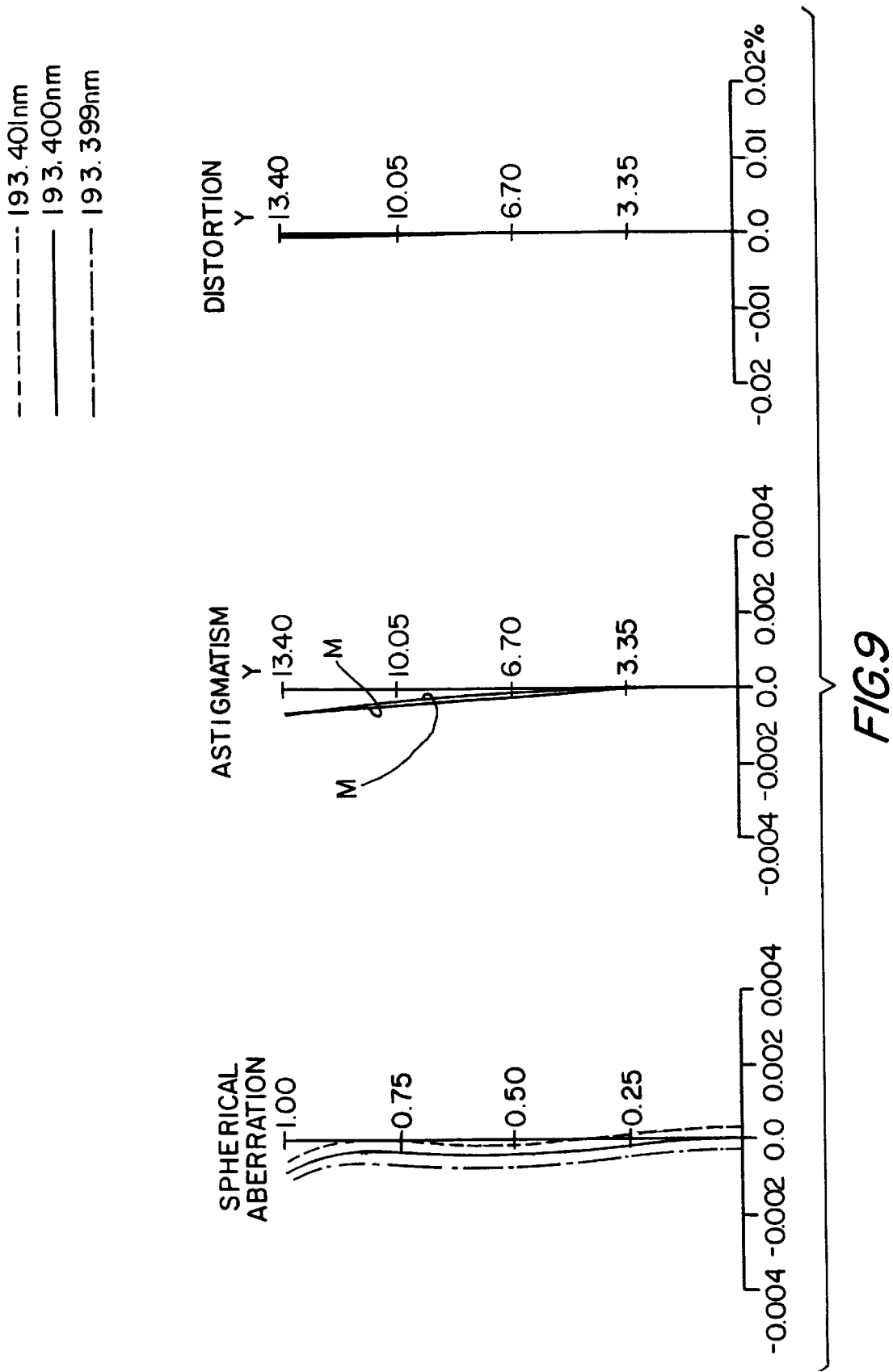
FIG. 9 are figures showing spherical aberrations, astigmatism and distortion for Embodiment 3.
Figure 10:
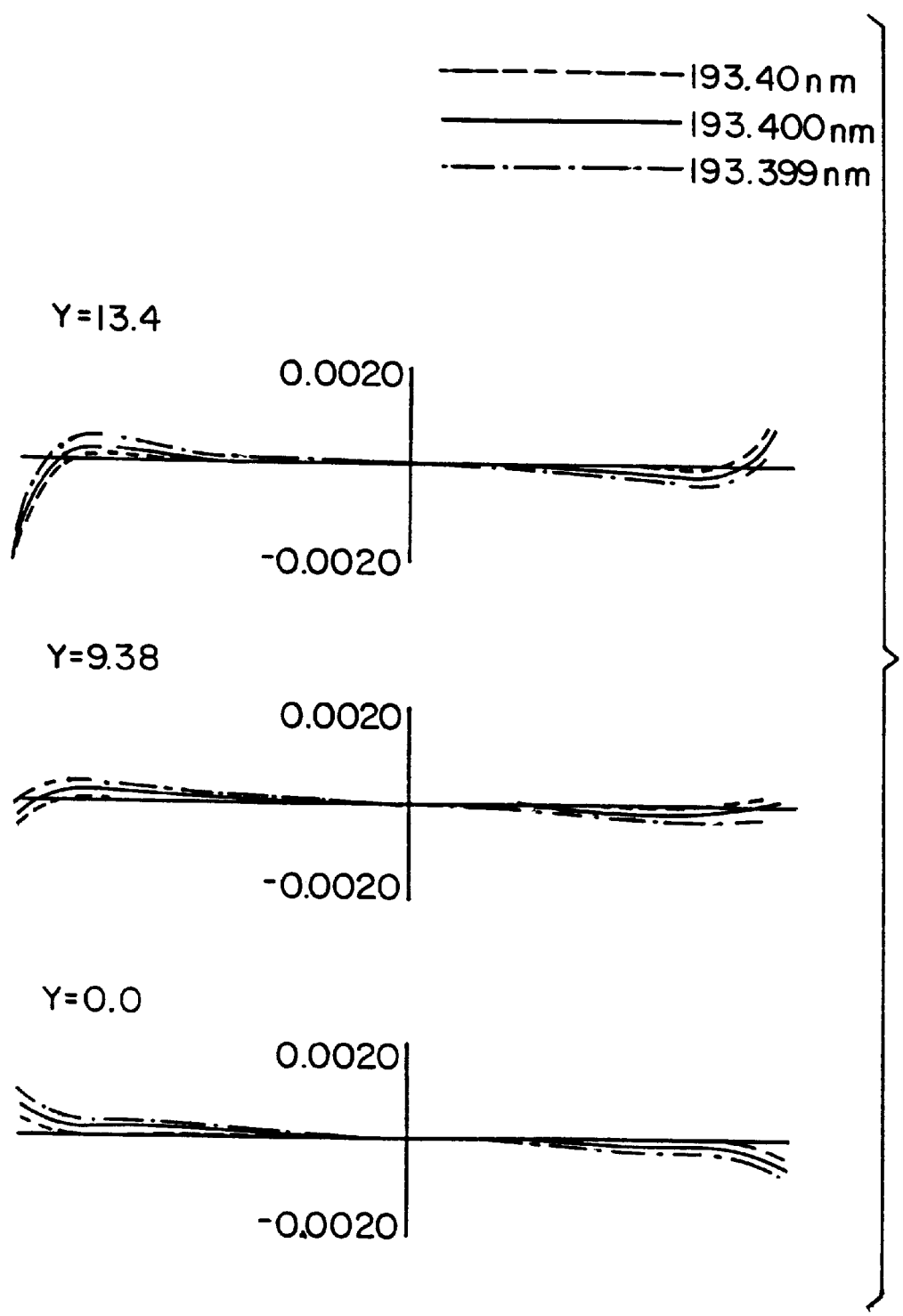
FIG. 10 are figures showing lateral aberrations for Embodiment 3.
Figure 12:
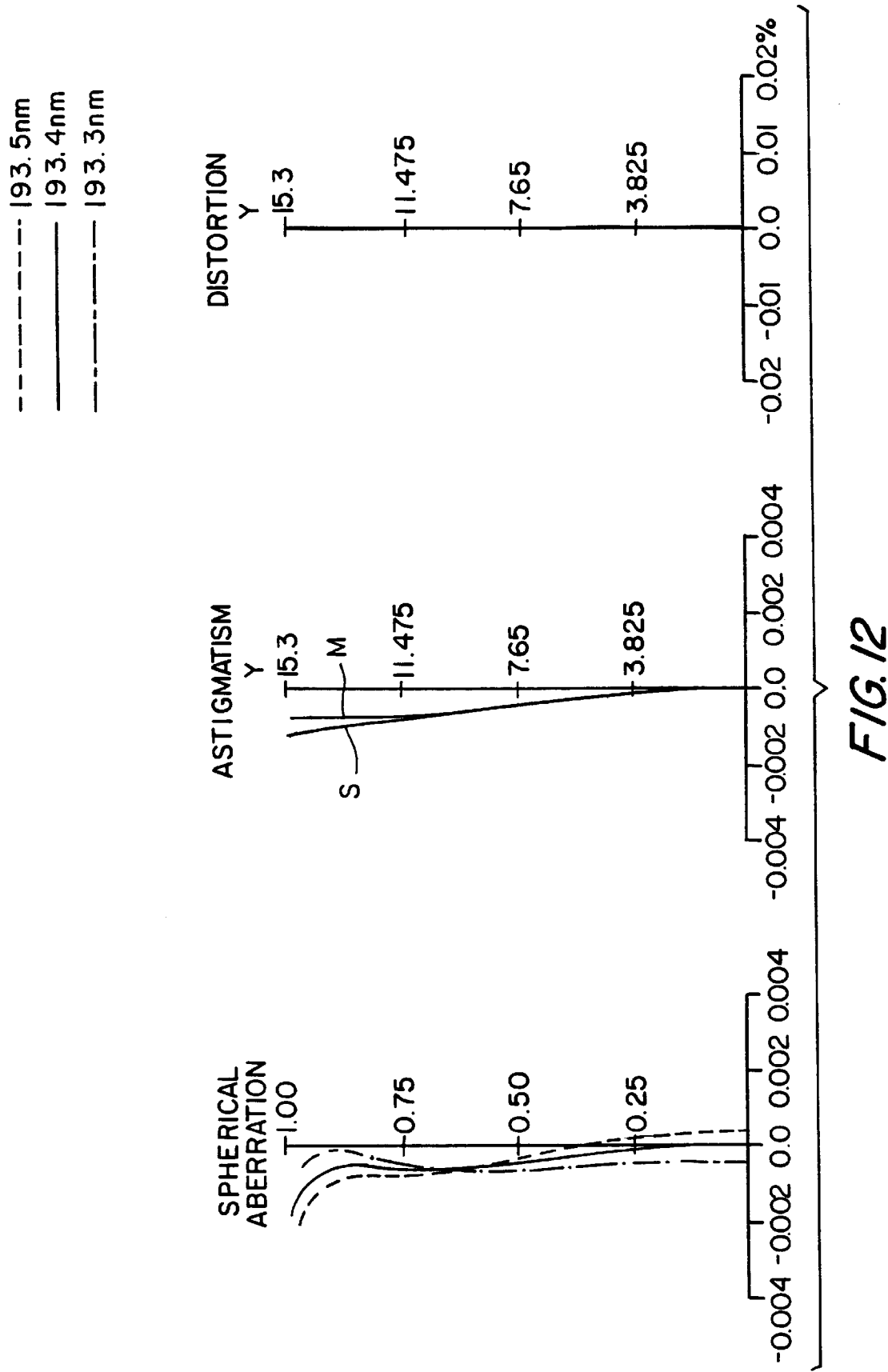
FIG. 12 are figures showing spherical aberrations, astigmatism and distortion for Embodiment 4.
Figure 13:
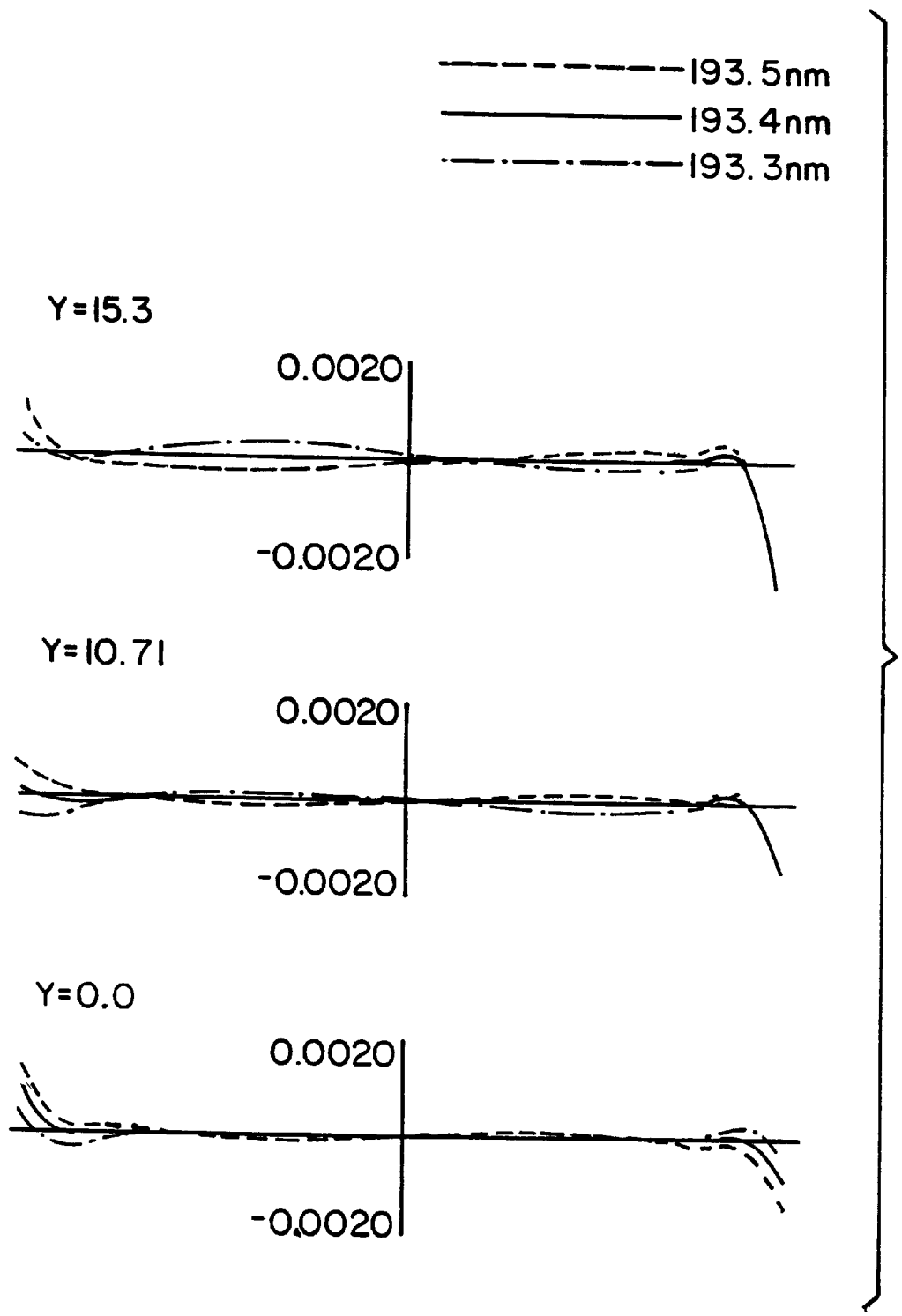
FIG. 13 are figures showing lateral aberrations for Embodiment 4.

FIG. 3 shows spherical aberrations, astigmatism and distortion of Embodiment 1. FIG. 4 shows lateral aberrations of Embodiment 1. Similarly, FIGS. 6 and 7 show various aberrations of Embodiment 2. FIGS. 9 and 10 show various aberrations for Embodiment 3. FIGS. 12 and 13 show various aberrations for Embodiment 4. In figures showing astigmatism, M indicates a meridional image plane, and S indicates a sagittal image plane. Also, Y indicates an image height in each of the figures showing various aberrations.

As obvious from each of the figures, each of the embodiments comprise a required lens structure which satisfies conditions (1) through (9) such that fine imaging performance is obtained.

Furthermore, although an excimer laser is used as an exposure light source at 193.4 nm in all of the above embodiments it is obvious that the invention is not limited to an excimer laser light source of 193.4 nm or to any given excimer laser light source. In this regard an ultraviolet light source such as an excimer laser supplying 248.4 nm light beams may be used or a mercury ark lamp supplying a g-line (436 nm) or an i-line (365 nm) or even other light sources outside the ultraviolet region may be applied.

Figure 11:
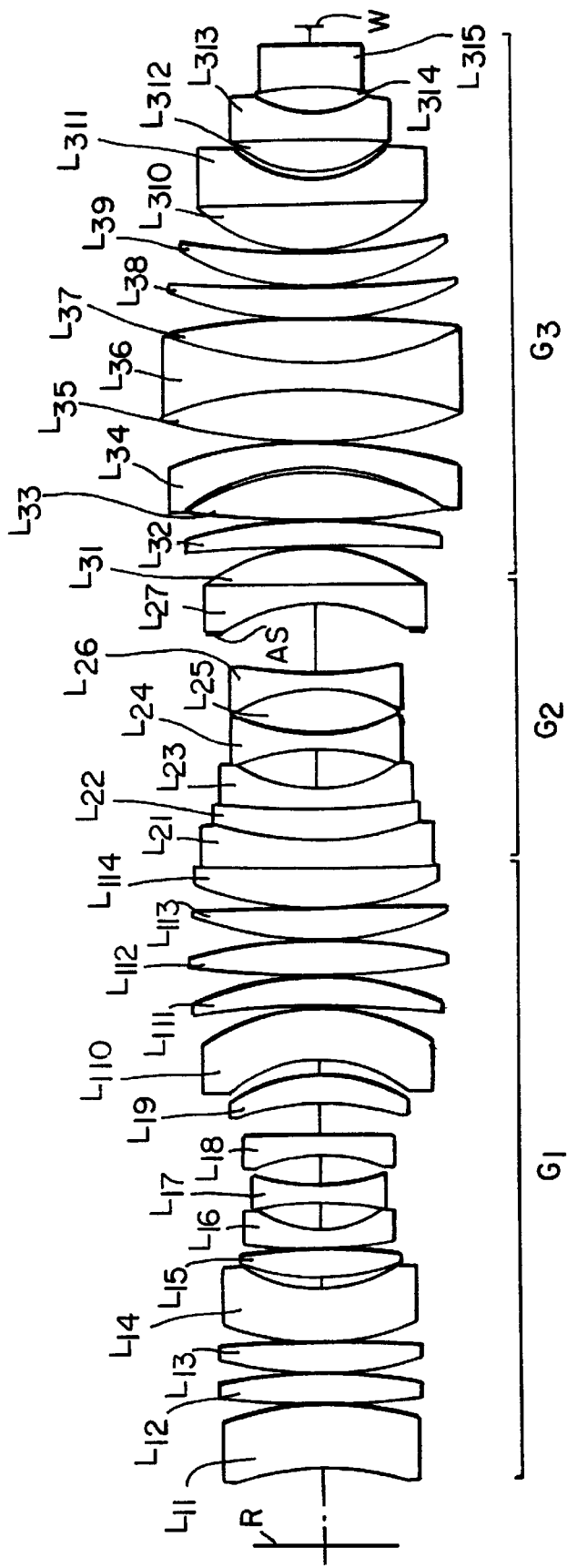
FIG. 11 shows the lens structure for Embodiment 4 of the projection optical system of the present invention.

In the refracting projection optical system of Embodiment 4 shown in FIG. 11, NA at the image end is 0.6, projection magnification $\beta$ is ¼, and the diameter of the exposure area at the image end is 30.6. Also, chromatic aberrations are compensated by consideration of ±100 pm of spectrum range. First lens group G1 comprises 14 lens elements L11 through L114; with the last 4 lens elements L111 through L114 made of fluorite, and the other 10 lens elements made of quartz. Second lens group G2 comprises 7 lens elements L21 through L27; with 2 of the lens elements L22 and L25 made of fluorite, and the remaining 5 lens elements made of quartz. The third lens group G3 comprises 15 lens elements L31 through L315; with 10 of the lens elements made of fluorite, and the other 5 lens elements made of quartz.

In this embodiment, chromatic aberrations are compensated by consideration of ±100 pm of spectrum range. Dispersion corresponding to a range of ±100 pm is about 100 times larger than dispersion corresponding to a range of ±1 pm. Therefore, fluorite lens elements are placed in first lens group G1 as well as in second lens group G2. Also, in this embodiment, compensations of both chromatic aberrations and coma aberrations are accomplished by a structure in which:

biconvex fluorite lens element L33 and meniscus quartz lens element L34 have its concave surface toward the objective end and are placed adjacent to each other at a high position of the paraxial ray height in the third lens group G3; and biconcave quartz lens element L36 is placed between biconvex fluorite lens elements L35 and L37.

Various indication values of Embodiments 1 through 4 are shown in Tables 1 through 4, respectively. In the tables:

the first column indicates numbers of each lens surface in order from the objective end (the side of the reticle);

the second column r indicates a radius of curvature of each lens;

the third column d indicates distance between lens surfaces;

the fourth column indicates material of each lens; and the fifth column indicates element numbers of each lens.

Refractive indexes n of quartz ($SiO_2$) and fluorite ($CaF_2$) corresponding to exposure wavelength of 193.4 nm are:

$SiO_2$: n=1.56019

$CaF_2$: n=1.50138.

Also, a dispersion value at exposure wavelength of 193.4 nm with spectrum range of ±1 pm $\nu(\pm 1 \text{ pm})=(n-1)/\delta n\ (\pm 1 \text{ pm})$ and a dispersion value with spectrum range of ±100 pm $\nu(\pm 100 \text{ pm})=(n-1)/\delta n\ (\pm 100 \text{ pm})$ of quartz ($SiO_2$) and fluorite ($CaF_2$) are:

$SiO_2$: $\nu(\pm 1 \text{ pm})=175060$
$\nu(\pm 100 \text{ pm})=1776$ $CaF_2$: $\nu(\pm 1 \text{ pm})=250690$
$\nu(\pm 100 \text{ pm})=2545$.

Also, parameters of each of the conditions (1) through (9) for each of the embodiments are shown in Table 5.

TABLE 1

|   | r | d | | |
|---|---|---|---|---|
| 0 | (Reticle) | 88.563400 | | |
| 1 | −291.35363 | 73.000000 | $SiO_2$ | $L_{11}$ |
| 2 | −275.27636 | 0.500000 | | |
| 3 | 480.01519 | 24.000000 | $SiO_2$ | $L_{12}$ |
| 4 | −618.65478 | 0.500000 | | |
| 5 | 214.89558 | 25.500000 | $SiO_2$ | $L_{13}$ |
| 6 | 3089.97605 | 0.500000 | | |
| 7 | 177.49323 | 23.544537 | $SiO_2$ | $L_{14}$ |
| 8 | 101.56031 | 15.912587 | | |
| 9 | 208.30038 | 21.300000 | $SiO_2$ | $L_{15}$ |
| 10 | −836.08898 | 0.500000 | | |
| 11 | 700.00000 | 19.095104 | $SiO_2$ | $L_{16}$ |
| 12 | 108.03348 | 23.338460 | | |
| 13 | −309.96962 | 15.382167 | $SiO_2$ | $L_{17}$ |
| 14 | 234.69175 | 21.216782 | | |
| 15 | −162.16136 | 15.448042 | $SiO_2$ | $L_{18}$ |
| 16 | 956.86947 | 60.284514 | | |
| 17 | −2137.69687 | 26.416153 | $SiO_2$ | $L_{19}$ |
| 18 | −188.00000 | 13.000000 | | |
| 19 | −131.30000 | 34.711647 | $SiO_2$ | $L_{110}$ |
| 20 | −240.61303 | 0.500000 | | |
| 21 | −6627.29844 | 26.520978 | $SiO_2$ | $L_{111}$ |
| 22 | −337.81795 | 0.500000 | | |
| 23 | 757.15974 | 29.000000 | $SiO_2$ | $L_{112}$ |
| 24 | −513.00000 | 0.500000 | | |
| 25 | 403.00000 | 28.000000 | $SiO_2$ | $L_{113}$ |
| 26 | −2209.19099 | 0.500000 | | |
| 27 | 217.54212 | 41.573943 | $SiO_2$ | $L_{114}$ |
| 28 | −3600.00000 | 0.500000 | | |
| 29 | 3788.06971 | 30.453059 | $SiO_2$ | $L_{21}$ |
| 30 | 154.05985 | 11.669230 | | |
| 31 | 258.71144 | 16.443006 | $SiO_2$ | $L_{22}$ |
| 32 | 152.03153 | 35.149248 | | |
| 33 | −215.38561 | 14.321328 | $SiO_2$ | $L_{23}$ |
| 34 | 367.44653 | 28.000000 | | |
| 35 | (Aperture Stop) | 25.342046 | | |
| 36 | −150.70652 | 13.629325 | $SiO_2$ | $L_{24}$ |
| 37 | 8355.78260 | 0.500000 | | |
| 38 | 4600.00000 | 32.000000 | $CaF_2$ | $L_{31}$ |
| 39 | −176.69990 | 0.500000 | | |
| 40 | −2887.58688 | 21.000000 | $SiO_2$ | $L_{32}$ |
| 41 | −338.62181 | 0.500000 | | |
| 42 | 419.32560 | 38.720628 | $CaF_2$ | $L_{33}$ |
| 43 | −342.21997 | 90.17132 | | |

TABLE 1-continued

|    | r          | d         |        |          |
|----|------------|-----------|--------|----------|
| 44 | −233.57362 | 21.000000 | SiO$_2$ | L$_{34}$ |
| 45 | −1103.12332 | 0.5000000 |        |          |
| 46 | 520.00000  | 26.000000 | CaF$_2$ | L$_{35}$ |
| 47 | −1118.98353 | 0.500000 |        |          |
| 48 | 395.37562  | 27.500000 | SiO$_2$ | L$_{36}$ |
| 49 | −2538.47741 | 0.500000 |        |          |
| 50 | 262.51253  | 27.500000 | CaF$_2$ | L$_{37}$ |
| 51 | 1300.00000 | 0.500000  |        |          |
| 52 | 133.90538  | 42.963984 | CaF$_2$ | L$_{38}$ |
| 53 | 864.11488  | 1.158603  |        |          |
| 54 | 1228.69680 | 21.100763 | SiO$_2$ | L$_{39}$ |
| 55 | 953.98148  | 6.365035  |        |          |
| 56 | 108.11671  | 39.251047 | CaF$_2$ | L$_{310}$ |
| 57 | −3500.00000 | 0.530420 |        |          |
| 58 | −2962.27096 | 63.550033 | SiO$_2$ | L$_{311}$ |
| 59 | 510.49529  | 14.426921 |        |          |
| 60 | (Wafer)    |           |        |          |

TABLE 2

|    | r          | d         |        |          |
|----|------------|-----------|--------|----------|
| 0  | (Reticle)  | 87.809583 |        |          |
| 1  | −362.32686 | 73.000000 | SiO$_2$ | L$_{11}$ |
| 2  | −309.51040 | 0.500000  |        |          |
| 3  | 391.00320  | 24.000000 | SiO$_2$ | L$_{12}$ |
| 4  | −721.38993 | 0.500000  |        |          |
| 5  | 227.13393  | 25.500000 | SiO$_2$ | L$_{13}$ |
| 6  | 5705.55505 | 0.500000  |        |          |
| 7  | 192.49202  | 19.470434 | SiO$_2$ | L$_{14}$ |
| 8  | 103.23979  | 15.912587 |        |          |
| 9  | 216.43156  | 21.300000 | SiO$_2$ | L15      |
| 10 | −626.30729 | 0.500000  |        |          |
| 11 | 700.00000  | 19.095104 | SiO$_2$ | L$_{16}$ |
| 12 | 116.08921  | 23.338460 |        |          |
| 13 | −253.52781 | 15.382167 | SiO$_2$ | L$_{17}$ |
| 14 | 238.54927  | 21.216782 |        |          |
| 15 | −157.82490 | 15.448042 | SiO$_2$ | L$_{18}$ |
| 16 | 742.64342  | 58.810956 |        |          |
| 17 | −3922.38675 | 26.416153 | SiO$_2$ | L$_{19}$ |
| 18 | −188.00000 | 13.696393 |        |          |
| 19 | −131.30000 | 34.304033 | SiO$_2$ | L$_{110}$ |
| 20 | −234.31195 | 0.500000  |        |          |
| 21 | −3481.76680 | 26.520978 | SiO$_2$ | L$_{111}$ |
| 22 | −324.33350 | 0.500000  |        |          |
| 23 | 772.98524  | 29.000000 | SiO$_2$ | L$_{112}$ |
| 24 | −513.00000 | 0.500000  |        |          |
| 25 | 403.00000  | 28.000000 | SiO$_2$ | L$_{113}$ |
| 26 | −2036.40977 | 0.500000 |        |          |
| 27 | 220.05778  | 42.629600 | SiO$_2$ | L$_{114}$ |
| 28 | −3600.00000 | 0.500000 |        |          |
| 29 | −3785.46147 | 31.537549 | SiO$_2$ | L$_{21}$ |
| 30 | 150.37555  | 11.669230 |        |          |
| 31 | 246.26737  | 16.443006 | SiO$_2$ | L$_{22}$ |
| 32 | 156.76128  | 40.146907 |        |          |
| 33 | −207.62202 | 14.321328 | SiO$_2$ | L$_{23}$ |
| 34 | 368.72637  | 29.000000 |        |          |
| 35 | (Aperture Stop) | 21.698779 |    |          |
| 36 | −148.87213 | 14.010068 | SiO$_2$ | L$_{24}$ |
| 37 | 9053.85035 | 0.500000  |        |          |
| 38 | 4600.00000 | 32.000000 | CaF$_2$ | L$_{31}$ |
| 39 | −178.53029 | 0.500000  |        |          |
| 40 | −1783.59259 | 21.000000 | SiO$_2$ | L$_{32}$ |
| 41 | −318.03867 | 0.500000  |        |          |
| 42 | 412.11180  | 38.720628 | CaF$_2$ | L$_{33}$ |
| 43 | −337.09142 | 9.729076  |        |          |
| 44 | −231.04745 | 21.000000 | SiO$_2$ | L$_{34}$ |
| 45 | −1072.64383 | 0.500000 |        |          |
| 46 | 620.00000  | 26.000000 | CaF$_2$ | L$_{35}$ |
| 47 | −1083.02216 | 0.500000 |        |          |
| 48 | 378.86703  | 27.500000 | SiO$_2$ | L$_{36}$ |
| 49 | −4093.90236 | 0.500000 |        |          |
| 50 | 268.72335  | 27.500000 | CaF$_2$ | L$_{37}$ |
| 51 | 1000.00000 | 0.500000  |        |          |

TABLE 2-continued

|    | r          | d         |        |          |
|----|------------|-----------|--------|----------|
| 52 | 137.71322  | 42.963984 | CaF$_2$ | L$_{38}$ |
| 53 | 752.18201  | 2.379423  |        |          |
| 54 | 1127.95978 | 22.281076 | SiO$_2$ | L$_{39}$ |
| 55 | 103.84447  | 6.365035  |        |          |
| 56 | 121.81745  | 39.251047 | SiO$_2$ | L$_{310}$ |
| 57 | −3500.00000 | 0.530420 |        |          |
| 58 | −3215.04047 | 60.256455 | SiO$_2$ | L$_{311}$ |
| 59 | 493.36069  | 14.427099 |        |          |
| 60 | (Wafer)    |           |        |          |

TABLE 3

|    | r          | d         |        |          |
|----|------------|-----------|--------|----------|
| 0  | (Reticle)  | 103.390978 |       |          |
| 1  | −453.18731 | 17.000000 | SiO$_2$ | L$_{11}$ |
| 2  | 370.52697  | 13.613089 |        |          |
| 3  | 710.84358  | 26.000000 | SiO$_2$ | L$_{12}$ |
| 4  | −350.78200 | 1.000000  |        |          |
| 5  | 367.53957  | 28.000000 | SiO$_2$ | L$_{13}$ |
| 6  | −567.47540 | 1.000000  |        |          |
| 7  | 289.50734  | 29.000000 | SiO$_2$ | L$_{14}$ |
| 8  | −899.09021 | 1.000000  |        |          |
| 9  | 199.45895  | 23.000000 | SiO$_2$ | L$_{15}$ |
| 10 | 103.61200  | 15.764153 |        |          |
| 11 | 188.56105  | 25.800000 | SiO$_2$ | L$_{16}$ |
| 12 | −547.20881 | 4.242446  |        |          |
| 13 | 3000.00000 | 16.616840 | SiO$_2$ | L$_{17}$ |
| 14 | 118.18165  | 21.762847 |        |          |
| 15 | −336.11504 | 15.000000 | SiO$_2$ | L$_{18}$ |
| 16 | 161.39927  | 25.871656 |        |          |
| 17 | −120.57109 | 15.000000 | SiO$_2$ | L$_{19}$ |
| 18 | ∞          | 33.995810 |        |          |
| 19 | −2985.44349 | 36.979230 | SiO$_2$ | L$_{110}$ |
| 20 | −150.10550 | 11.683590 |        |          |
| 21 | −122.25791 | 28.000000 | SiO$_2$ | L$_{111}$ |
| 22 | −204.99200 | 1.000000  |        |          |
| 23 | ∞          | 29.240000 | SiO$_2$ | L$_{112}$ |
| 24 | −312.57215 | 1.000000  |        |          |
| 25 | 965.45342  | 27.000000 | SiO$_2$ | L$_{113}$ |
| 26 | −643.40298 | 1.000000  |        |          |
| 27 | 258.67450  | 39.000000 | CaF$_2$ | L$_{114}$ |
| 28 | −2967.14698 | 1.000000 |        |          |
| 29 | 246.35328  | 35.600000 | CaF$_2$ | L$_{115}$ |
| 30 | −2970.04481 | 1.000000 |        |          |
| 31 | ∞          | 24.000000 | SiO$_2$ | L$_{21}$ |
| 32 | 157.63171  | 10.667015 |        |          |
| 33 | 234.15227  | 17.000000 | SiO$_2$ | L$_{22}$ |
| 34 | 157.66180  | 32.592494 |        |          |
| 35 | −200.72428 | 15.000000 | SiO$_2$ | L$_{23}$ |
| 36 | 432.89447  | 37.939196 |        |          |
| 37 | (Aperture Stop) | 24.400000 |    |          |
| 38 | −175.71116 | 17.000000 | SiO$_2$ | L$_{24}$ |
| 39 | −2985.98357 | 1.000000 |        |          |
| 40 | −2985.99700 | 35.500000 | CaF$_2$ | L$_{31}$ |
| 41 | −189.63629 | 1.000000  |        |          |
| 42 | −3000.00000 | 24.400000 | SiO$_2$ | L$_{32}$ |
| 43 | −350.29744 | 1.000000  |        |          |
| 44 | 362.38815  | 46.500000 | CaF$_2$ | L$_{33}$ |
| 45 | −361.31567 | 10.870000 |        |          |
| 46 | −251.97148 | 23.000000 | SiO$_2$ | L$_{34}$ |
| 47 | −662.28158 | 1.000000  |        |          |
| 48 | 238.98700  | 38.100000 | CaF$_2$ | L$_{35}$ |
| 49 | 1994.63265 | 1.000000  |        |          |
| 50 | 211.51173  | 33.400000 | CaF$_2$ | L$_{36}$ |
| 51 | 720.00000  | 1.000000  |        |          |
| 52 | 129.92966  | 46.000000 | CaF$_2$ | L$_{37}$ |
| 53 | 669.85166  | 2.783304  |        |          |
| 54 | 970.74182  | 19.986222 | SiO$_2$ | L$_{38}$ |
| 55 | 78.2021    | 6.273142  |        |          |
| 56 | 86.12755   | 32.522737 | SiO$_2$ | L$_{39}$ |
| 57 | 230.00000  | 2.862480  |        |          |

TABLE 3-continued

| | r | d | | |
|---|---|---|---|---|
| 58 | 232.22064 | 44.183443 | $SiO_2$ | $L_{310}$ |
| 59 | 350.03691 | 19.466219 | | |
| 60 | (Wafer) | | | |

TABLE 4

| | r | d | | |
|---|---|---|---|---|
| 0 | (Reticle) | 64.520598 | | |
| 1 | −235.90617 | 53.784690 | $SiO_2$ | $L_{11}$ |
| 2 | −270.16209 | 0.500000 | | |
| 3 | 1127.68810 | 23.000000 | $SiO_2$ | $L_{12}$ |
| 4 | −458.14547 | 0.367730 | | |
| 5 | 309.41543 | 24.901540 | $SiO_2$ | $L_{13}$ |
| 6 | −1621.84734 | 0.500000 | | |
| 7 | 214.91745 | 45.302946 | $SiO_2$ | $L_{14}$ |
| 8 | 125.60336 | 11.179000 | | |
| 9 | 197.70102 | 22.419900 | $SiO_2$ | $L_{15}$ |
| 10 | 673.74044 | 0.000000 | | |
| 11 | 452.71985 | 17.000000 | $SiO_2$ | $L_{16}$ |
| 12 | 114.80732 | 19.500000 | | |
| 13 | −353.2711 | 16.000000 | $SiO_2$ | $L_{17}$ |
| 14 | 174.94617 | 23.520550 | | |
| 15 | −160.93746 | 16.280830 | $SiO_2$ | $L_{18}$ |
| 16 | 1343.01697 | 25.994827 | | |
| 17 | −246.69033 | 22.509494 | $SiO_2$ | $L_{19}$ |
| 18 | −154.78807 | 11.564785 | | |
| 19 | −127.42035 | 45.572168 | $SiO_2$ | $L_{110}$ |
| 20 | −182.19878 | 0.500000 | | |
| 21 | −1134.00789 | 26.000000 | $CaF_2$ | $L_{111}$ |
| 22 | 248.33375 | 0.500000 | | |
| 23 | 782.76783 | 27.000000 | $CaF_2$ | $L_{112}$ |
| 24 | −438.84333 | 0.500000 | | |
| 25 | 267.38925 | 27.500000 | $CaF_2$ | $L_{113}$ |
| 26 | −5093.23484 | 0.500000 | | |
| 27 | 244.65801 | 32.000000 | $CaF_2$ | $L_{114}$ |
| 28 | 1588.21390 | 0.500000 | | |
| 29 | 1628.15704 | 21.963457 | $SiO_2$ | $L_{21}$ |
| 30 | 266.08836 | 2.000000 | | |
| 31 | 279.13822 | 26.251010 | $CaF_2$ | $L_{22}$ |
| 32 | 1381.05415 | 0.500000 | | |
| 33 | 1027.40289 | 16.000000 | $SiO_2$ | $L_{23}$ |
| 34 | 133.99485 | 30.000000 | | |
| 35 | −228.39309 | 13.000000 | $SiO_2$ | $L_{24}$ |
| 36 | 169.83955 | 0.500000 | | |
| 37 | 159.15726 | 35.000000 | $CaF_2$ | $L_{25}$ |
| 38 | −143.16000 | 0.500000 | | |
| 39 | −144.77183 | 13.000000 | $SiO_2$ | $L_{26}$ |
| 40 | 409.94567 | 35.800000 | | |
| 41 | (Aperture Stop) | 23.593530 | | |
| 42 | −135.57463 | 14.318428 | $SiO_2$ | $L_{27}$ |
| 43 | −16818.16789 | 0.367730 | | |
| 44 | 60950.20145 | 31.000000 | $CaF_2$ | $L_{31}$ |
| 45 | −159.57823 | 0.367730 | | |
| 46 | −1506.50081 | 20.151610 | $CaF_2$ | $L_{32}$ |
| 47 | −398.40906 | 0.367730 | | |
| 48 | 761.40374 | 39.000000 | $CaF_2$ | $L_{33}$ |
| 49 | −208.34770 | 4.500000 | | |
| 50 | −192.33440 | 20.000000 | $SiO_2$ | $L_{34}$ |
| 51 | −407.53523 | 0.000000 | | |
| 52 | 431.18425 | 43.000000 | $CaF_2$ | $L_{35}$ |
| 53 | −390.96789 | 1.000000 | | |
| 54 | −383.12423 | 21.000000 | $SiO_2$ | $L_{36}$ |
| 55 | 331.78052 | 0.500000 | | |
| 56 | 303.35407 | 34.000000 | $CaF_2$ | $L_{37}$ |
| 57 | −1111.68345 | 0.367730 | | |
| 58 | 282.13377 | 28.500000 | $CaF_2$ | $L_{38}$ |
| 59 | 2418.86602 | 0.367730 | | |
| 60 | 210.27525 | 28.000000 | $CaF_2$ | $L_{39}$ |
| 61 | 623.76444 | 0.367730 | | |
| 62 | 143.38374 | 38.685210 | $CaF_2$ | $L_{310}$ |
| 63 | 3343.33158 | 1.103190 | | |
| 64 | 31337.12818 | 20.000000 | $SiO_2$ | $L_{311}$ |
| 65 | 96.43594 | 4.500000 | | |

TABLE 4-continued

| | r | d | | |
|---|---|---|---|---|
| 66 | 107.06192 | 28.000000 | $CaF_2$ | $L_{312}$ |
| 67 | −856.93233 | 0.500000 | | |
| 68 | 896.03322 | 18.000000 | $SiO_2$ | $L_{313}$ |
| 69 | 79.31691 | 1.500000 | | |
| 70 | 81.33364 | 21.000000 | $CaF_2$ | $L_{314}$ |
| 71 | −375.43232 | 0.500000 | | |
| 72 | −385.00000 | 34.811128 | $SiO_2$ | $L_{315}$ |
| 73 | 646.31465 | 15.330000 | | |
| 74 | (Wafer) | | | |

TABLE 5

| Embodiment No. | 1 | 2 | 3 | 4 |
|---|---|---|---|---|
| (1) $\|L/f\|$ | 1.3770 | 1.4058 | 1.1736 | 1.2924 |
| (2) $f_3/f_{3C}$ | 1.3127 | 0.7908 | 1.1233 | 2.3275 |
| (3) $h_{3Cmax}/h_{3max}$ | 0.9995 | 0.9994 | 0.9920 | 0.9857 |
| (4) $h_{3Qmax}/h_{3max}$ | 0.9934 | 0.9924 | 0.9655 | 0.9902 |
| (5) $f_3/L$ | 0.0868 | 0.0871 | 0.0913 | 0.0915 |
| (6) $f_{3Cmax}/L$ | 0.3148 | 0.3103 | 0.3030 | 0.3277 |
| (7) $\|f_{3Qmax}/L\|$ | 0.4406 | 0.4384 | 0.6058 | 0.5207 |
| (8) $h_{3Cave}/h_{3max}$ | 0.8338 | 0.8862 | 0.8728 | 0.7869 |
| (9) $f_1/f_{1C}$ | — | — | 1.0074 | 1.6897 |

What is claimed is:

1. A reducing refraction projection optical system having an objective end and an image end with said optical system having a large numerical aperture at said image end and being formed of only refraction lens elements comprising: in order from said objective end to said image end:

a first lens group G1 having positive power;

a second lens group G2 having negative power; and a third lens group G3 having positive power, said third lens group including at least two fluorite lens elements and at least one quartz lens element;

wherein each of the lens groups have lens elements with all of the lens elements composed of glass materials selected from the group consisting of fluorite and quartz; and wherein the following conditions are satisfied:

$$|L/f| < 2$$
$$0.7 \leq f_3/f_{3c} \leq 2.8$$

where:

L: distance between an objective plane and an image plane f: focal length of the entire system $f_3$: focal length of the third lens group G3

$f_{3c}$: composite focal length of fluorite lens elements which are included in the third lens group G3, and wherein the composite focal length of the fluorite lens elements in the third lens group $f_{3c}$ is defined by the following equation:

$$1/f_{3c} \equiv 1/h_{3\max} \cdot \sum_{3C} h_k / f_k$$

where:

$h_{3max}$: maximum value of paraxial ray height at the third lens group G3

$f_k$: focal length of each fluorite lens element of the third lens group $h_k$: average of heights of paraxial rays at the front and back surfaces of each fluorite lens element of the third lens group $\Sigma_{3c}$: sum of all fluorite lens elements included in the third lens group G3.

2. A projection optical system as defined in claim 1 which further satisfies the following condition:

$$0.8 \leq h_{3Cmax}/h_{3max}$$

where:

$h_{3Cmax}$: maximum value of paraxial ray height of all fluorite lens elements included in said third lens group G3.

3. A projection optical system as defined in claim 2 which further satisfies the following condition:

$$0.8 \leq h_{3Qmax}/h_{3max}$$

where:

$h_{3Qmax}$: maximum value of paraxial ray height of all quartz lens elements included in said third lens group G3.

4. A projection optical system as defined in claim 3 which further satisfies the following condition:

$$0.07 \leq f_3/L \leq 0.15.$$

5. A projection optical system as defined in claim 4 which further satisfies the following condition:

$$0.15 \leq f_{3Cmax}/L \leq 1$$

where:

$f_{3Cmax}$: focal length of a fluorite lens element which is placed such that its paraxial ray height is the highest among all fluorite lens elements of positive power included in said third lens group G3 with at least one of the fluorite lens elements of the third lens group being of positive power.

6. A projection optical system as defined in claim 5 which further satisfies the following condition:

$$0.2 \leq |f_{3Qmax}/L| \leq 1$$

where:

$f_{3Qmax}$: focal length of a quartz lens element which is placed such that its paraxial ray height is the highest among all quartz lens elements of negative power included in said third lens group G3 with at least one of the quartz lens elements of the third lens group being of negative power.

7. A projection optical system as defined in claim 6 which further satisfies the following condition:

$$0.8 \leq h_{3Cave}/h_{3max}$$

where:

$h_{3Cave}$: average of paraxial ray heights of all fluorite lens elements included in said third lens group G3.

8. A projection optical system as defined in claim 7 in which said first lens group G1 includes at least two fluorite lens elements and at least one quartz lens element; and said projection optical system satisfies the following condition:

$$0.7 \leq f_1/f_{1c} \leq 2.5 \tag{9}$$

where:

$f_1$: focal length of said first lens group G1

$f_{1c}$: comprise focal length of fluorite lens elements included in said first lens group G1 also:

$$1/f_{1c} \equiv 1/h_{1max} \cdot \sum_{1C} h_k/f_k$$

where:

$h_{1max}$: maximum value of paraxial ray height of said first lens group G1

$\Sigma_{1c}$: sum of all fluorite lens elements included in said first lens group G $f_k$: focal length of each fluorite lens element of the first lens group;

$h_k$: average of heights of paraxial rays of each fluorite lens element of first lens group.

* * * * *